United States Patent
DeRosa et al.

(10) Patent No.: US 10,558,390 B2
(45) Date of Patent: Feb. 11, 2020

(54) PROBABALISTIC COMMAND AGING AND SELECTION

(71) Applicant: Seagate Technology LLC, Longmont, CO (US)

(72) Inventors: Jeffrey V. DeRosa, Shrewsbury, MA (US); Ling Zhi Yang, Longmont, CO (US); Kenneth L. Barham, Longmont, CO (US); Mark A. Gaertner, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 326 days.

(21) Appl. No.: 15/600,503

(22) Filed: May 19, 2017

(65) Prior Publication Data
US 2018/0335976 A1 Nov. 22, 2018

(51) Int. Cl.
*G06F 3/06* (2006.01)

(52) U.S. Cl.
CPC .......... *G06F 3/0659* (2013.01); *G06F 3/0611* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 2003/0182499 A1* | 9/2003 | Espeseth | G06F 3/0611 711/112 |
| 2007/0168610 A1 | 7/2007 | Kobayshi et al. | |
| 2011/0314182 A1 | 12/2011 | Muppirala et al. | |
| 2012/0297155 A1 | 11/2012 | Yamaguchi et al. | |
| 2014/0195699 A1* | 7/2014 | Sokol, Jr. | G06F 13/18 710/40 |
| 2015/0220278 A1 | 8/2015 | Sarcone et al. | |
| 2016/0004479 A1 | 1/2016 | Hayes et al. | |
| 2016/0098228 A1 | 4/2016 | Coronado et al. | |

\* cited by examiner

*Primary Examiner* — Tracy C. Chan
(74) *Attorney, Agent, or Firm* — Westman, Champlin & Koehler, P.A.

(57) ABSTRACT

Embodiments described herein are operable in a computing system. The computing system receives first and second commands (e.g., I/O commands). The computing system determines that the first command has a higher priority than the second I/O command, and queues the second command for servicing at a later time. The computing system services the first command, and services the second command after a timeout period based on performance degradation limit that decreases command processing performance of the computing system, overrides the timeout period, and increases a probability of executing the second command.

13 Claims, 8 Drawing Sheets

PROBABALISTIC COMMAND AGING AND SELECTION

CROSS REFERENCE TO RELATED APPLICATIONS

The patent application is related to commonly owned and co-pending U.S. patent application Ser. No. 14/471,981 filed Aug. 28, 2014, the entire contents of which are hereby incorporated by reference.

BACKGROUND

In computing, queueing may be used to store commands for subsequent execution. For example, various methods may be employed for selecting and servicing an Input/Output (I/O) command from a queue. Some examples of these methods include first-in-first-out (FIFO), last-in-first-out (LIFO), shortest processing time, and shortest access time. In some instances, the selection and servicing of a command is non-uniform in that it favors some aspect of the command over another. That is, one command may be selected for servicing over another based on some sort of prioritization. This may cause unselected commands to linger in the queue, generally referred to as "starvation". To prevent commands from starving, deadlines for executing the commands may be imposed. However, the disruption of executing a command that has met its deadline may reduce the overall performance of the system by causing a command timeout that could ultimately lead to a computing system undesirably servicing commands as FIFO.

SUMMARY

Embodiments described herein provide for servicing commands. For example, systems and methods herein generally enforce maximum command completion times in a way that substantially reduces disruption to performance, while minimizing the value of the maximum command completion time limits (e.g., by tightening the distribution of command completion times). In one embodiment, a method is operable in a computing system and includes receiving first and second commands (e.g., I/O commands) to the computing system. The method also includes determining that the first command has a higher priority than the second I/O command, and queueing the second command for servicing at a later time. The method also includes servicing the first command, and servicing the second command after a timeout period based on a selectable performance degradation value that overrides a timeout of the second command and increases a probability of executing the second I/O command.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including processor implementing instructions found in software and firmware, are described below.

BRIEF DESCRIPTION OF THE DRAWINGS

Some embodiments are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody the principles of the embodiments. Furthermore, any examples described herein are intended to aid in understanding the principles of the embodiments and are to be construed as being without limitation to such specifically recited examples and conditions. As a result, this disclosure is not limited to the specific embodiments or examples described below.

Figure 1:
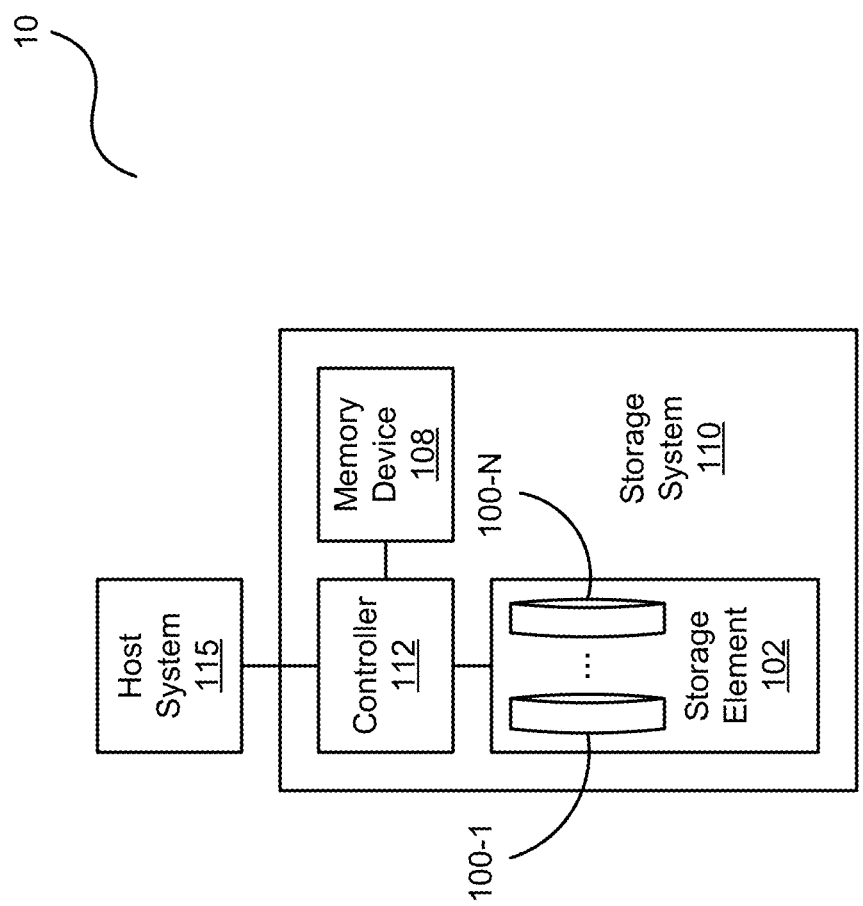
FIG. 1 is a block diagram of an exemplary computing system.

FIG. 1 is a block diagram of an exemplary computing system 10. The computing system 10 includes a host system 115 and a storage system 110. The storage system 110 includes a controller 112, a memory device 108, and a storage element 102 comprising one or more storage devices 100-1-100-N (where the reference number "N" is merely intended to represent an integer greater than "1" and not necessarily equal to any other "N" reference number designated herein). The storage devices 100-1-100-N of the storage element 102 may be hard disk drives (HDDs), solid-state drives (SSDs), or various combinations thereof. The memory device 108 may be a Random Access Memory (RAM, such as double data rate RAM), a solid state device (such as NAND flash memory), or any combination thereof.

The computing system 10 may be a single device, such as a desktop/laptop computer, a server, a smart phone, a digital music player, or the like. Alternatively, the components of the computing system 10 may be configured separately. For example, the host system 115 may be implemented as a computer that interfaces with the storage system 110. In this regard, the storage system 110 may be a network storage system or a cloud storage system to which the host system 115 interfaces to store and retrieve data. In one embodiment, the controller 112 is a Redundant Array of Independent Disks (RAID) storage controller and the storage system 110 is thus a RAID storage system.

Whatever the configuration, the computing system 10 is operable to prioritize commands, allowing both higher and lower priority commands to be executed by enforcing maximum command completion times in a way that allows for minimal disruption in performance, while minimizing the value of the maximum command completion time limits (e.g., by tightening the distribution of command completion times). For example, the host system 115 may issue I/O commands to the storage system 110 for the storage and retrieval of data. And, the controller 112 processes the I/O commands to access the individual storage devices 100-1-100-N of the storage element 102.

The I/O commands themselves may have assigned priorities which designate how and when the controller 112 processes the I/O commands. In one basic configuration, the I/O commands may have first and second priorities assigned thereto, with the first priority being higher than the second priority. In this instance, the first priority I/O command would have a maximum command completion time that is less than the second lower priority I/O command. For example, both higher and lower priority I/O commands are often queued for servicing at a later time. The higher priority I/O command would thus have a lower maximum time for execution from its time of arrival at the storage system 110 than the lower priority command.

Although the term "priority" as used herein refers to a maximum command completion time that specifies a maximum allowable time limit for a command to be executed from its time of arrival, other prioritization schemes may be employed. Additionally, the embodiments are not intended to be limited to I/O commands as the computing system 10 may employ other types of commands and/or tasks.

In some previous prioritization command servicing methods, a single command completion period would often be specified for all workloads. For example, in processing I/O commands at an HDD (e.g., the storage device 100-1), the command completion period needed to be relatively large (e.g., 600 ms to 3 seconds) to prevent a cascade of I/O command timeouts as such would lead to a FIFO behavior for the HDD. However, the larger command completion periods were problematic when shorter response times were desired. And, the larger command completion values lead to poor performance on average for the workloads.

The embodiments herein calculate a maximum command timeout period by means of a user-defined/tunable amount of performance degrade. For example, the controller 112 may have an established command completion time period based on the current workload presented to storage element 102. Workload parameters may include, for example, queue depth, transfer size, I/O rate, etc. The controller 112 may then allow for a maximum performance loss (e.g., due to stale timeouts) and use that performance loss to establish a probabilistic stale timeout period which would generally assure that older queued I/Os are serviced before reaching their maximum command completion time limits (e.g., before a timeout occurs).

Figure 2:
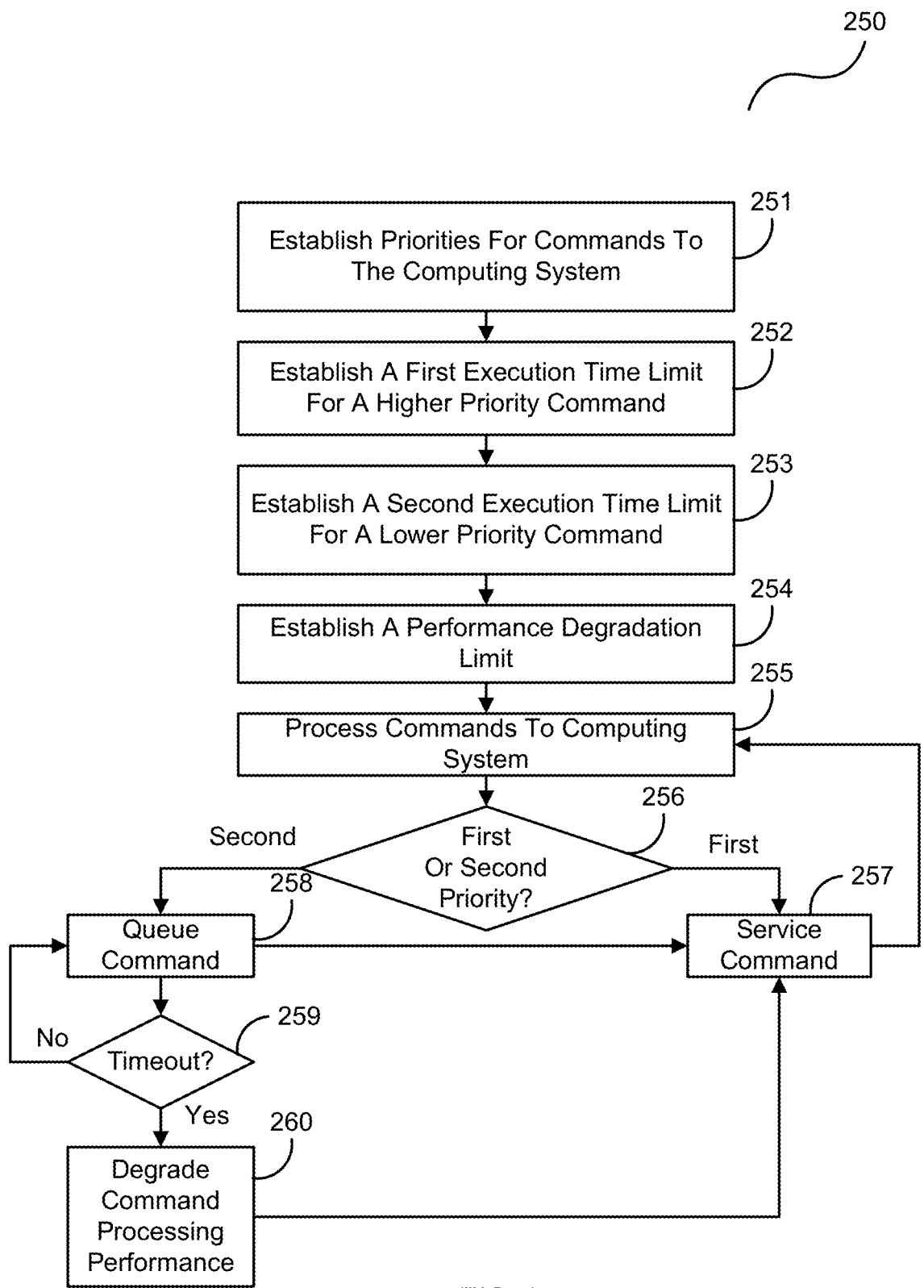
FIG. 2 is a flowchart of an exemplary process of the computing system of FIG. 1.

FIG. 2 is a flowchart of an exemplary process 250 of the computing system 10 of FIG. 1. In this embodiment, priorities for the commands to the computing system 10 are established, in the process element 251, such that the controller 112 can service higher priority commands queued in the memory device 108 before lower priority commands, while also generally assuring that the lower priority commands do not time out.

For the sake of simplicity, this embodiment describes commands having first and second priorities. And, time limits are established for servicing both priorities of commands. For example, the first/higher priority commands may have an established maximum execution time (i.e., the process element 252) that is shorter than the established maximum execution time of the second/lower priority commands (i.e., the process element 253).

A performance degradation limit may also be established, in the process element 254. Generally, this includes establishing a maximum allowable performance loss due to stale timeouts of the commands, and using this performance loss to establish a stale command limit. This part of the process is described in greater detail below. For example, I/O processing performance for the storage device 100-1 may be intentionally degraded by some amount to allow older queued I/Os to be serviced before reaching their maximum command completion time limits.

With the performance degradation limit established, the controller 112 can begin processing the commands, in the process element 255. Thus, in the process element 256, the controller 112 determines the priorities of the incoming commands. If an incoming command is a first priority command, the controller 112 may service the command before the second priority command, in the process element 257. If the command is a second priority command, the controller 112 may queue the second priority command in the memory device 108, in the process element 258, and then monitor the command's progress towards being serviced, in the process element 259. For example, the established time for the second priority command may cause the command to timeout if it is not serviced within that time. Thus, the controller 112 may monitor the timeout status of the queued second priority command. If no timeout has occurred, the controller 112 may monitor the queued second priority command until it is serviced, in the process element 257. Otherwise, if a timeout has occurred (or is about to occur), then the controller 112 may degrade the command processing performance, in the process element 260, based on the established performance degradation limit of the process element 254. This increases the probability that the command will be serviced, in the process element 257, while the performance of the computing system 10 is acceptably and temporarily degraded.

Generally, the controller 112 may queue the first priority command as well, albeit for a shorter period of time than the second priority command due to its shorter command completion time. However, in some instances, higher priority commands (e.g., commands of the first priority) can be serviced after lower priority commands (e.g., commands of the second priority). For example, when a lower priority command is approaching its command completion time, the lower priority command may be selected for execution even though a higher priority command also exists in the queue.

It should be noted, however, that the embodiments herein are not intended to be limited to any number of priorities for commands. For example, in one embodiment, the I/O commands to the storage system 110 may have a single priority and, thus, a single command completion time limit for executing the I/O command. In such a case, the embodiments herein allow queued I/O commands to execute before timing out by increasing their chances of being selected from the queue. To illustrate, the controller 112 may establish an execution time limit that defines a period of time in which all queued I/O commands to the storage system 110 are to execute. The controller 112, in this regard, may also establish a performance degradation value that temporarily decreases I/O processing performance of the storage system 110, overrides the execution time limit of an I/O command in the queue, and increases a probability of executing the queued I/O command as it approaches its command completion time limit. Thus, the embodiments herein showing two priorities are merely illustrative in nature and intend to aid the reader in understanding the embodiments disclosed herein.

Establishing the performance degradation limit will now be exemplarily discussed with respect to I/Os as these commands are common in terms of queueing. More specifically, the discussion will focus on I/Os to an HDD (e.g., storage device 100-1). For example, in an HDD embodiment, read and write I/Os may be sent by the host system 115 to the storage device 100-1, where they may be queued (e.g., in the memory device 108) while they await execution. The data associated with an I/O can have locational attributes, such as its rotational offset and track position (e.g., radius).

In selecting the next I/O to execute after the currently executing I/O is completed, the storage device 100-1 may calculate an access time for the I/Os (or some portion of the I/Os) in the queue from the end of the currently executing I/O, and select the I/O with the shortest access time from the ending position of the current I/O.

Again, the performance degradation limit is established based on stale timeouts of the I/Os and is used to establish a stale I/O limit (e.g., a buffer period to execute I/Os whose timeout periods have expired). The first step in this process is to multiply the total I/O rate by a user defined/acceptable amount of performance loss expressed as a percentage (e.g., 2%). The total I/O rate is that which is presented to the storage element 102, the storage system 110, or a storage device 100 in terms of "wedges".

Generally, a wedge refers to a fraction of a revolution of a magnetic disk. For example, the storage device 100-1 may have 500 wedges or "spokes" in a full rotation of a magnetic disk of the storage device 100-1 (e.g., a persistent storage medium). Accordingly, requiring 500 wedges to perform unqueued I/Os may indicate that, on average, the magnetic disk spins 500 wedges to complete the I/O operation, while the storage device 100-1 may only need to spin the magnetic disk 300 wedges to execute an average I/O when running at a queue depth of 128 I/Os.

Wedges may also be thought of as a measure of time, wherein an operation that takes 500 wedges to complete takes longer than an operation requiring 300 wedges. For example, if the storage device 100-1 is operating at a 128 I/O queue depth and performs an average of 300 wedges per I/O operation at 300 I/O operations per second, the storage device 100-1 may perform an average of 90,000 wedges per second (i.e., the number of wedges per I/O operation*number of I/O operations per second). Assuming that the storage device 100-1 has a maximum rotation speed, performing unqueued operations at a higher wedge count of 500 wedges per I/O would accordingly reduce the number of I/O operations that could be completed in a given time frame.

Returning to the discussion of establishing the performance degradation limit, the amount of performance loss is an upper bound and is calculated in terms of performance loss wedges (PLW). For example, the number of performance loss wedges is equal to the quantity of the average I/O rate in wedges (AIORIW) plus the average transfer time in wedges (AXTIW) times the performance loss target (PLT), as shown in Equation (Eq.) 1, as follows:

$$PLW=(AIORIW+AXTIW)PLT. \quad \text{Eq. 1.}$$

The PLW result generally needs to be equal to the probability of timeouts (POT) multiplied by a "cost" of a timeout ("delta wedges", or DW). These two equations are set equal to each other to solve for the unknown POT, as follows:

$$PLW=POT \cdot DW; \text{ and} \quad \text{Eq. 2.}$$

$$POT=PLW/DW. \quad \text{Eq. 3.}$$

Once the POT is found, the POT is used to find an index of entry into a table of probabilities of command aging. An example of such is shown and described below as well as in commonly owned and co-pending U.S. patent application Ser. No. 14/471,981. Then, that probability is inverted to yield a number of "trips remaining" (TR) in a queue (e.g., the stale I/O command limit in trips, "trips" being generally referred to as I/Os in the queue). The queue depth is corrected by dividing the TR by a queue depth scale (QDS). This value is then converted to milliseconds such that the stale I/O command limit can be computed, as follows:

$$\text{stale I/O command limit} = \frac{TR \cdot 1000}{I/O \text{ Rate} \cdot QDS}, \quad \text{Eq. 4}$$

where the I/O rate is the number of I/Os per second that the storage system 110, the storage element 102, or the individual storage devices 101 are operable to process.

To summarize, the controller 112, in one embodiment, would generally assure that all "high" priority I/Os are forced into execution once they reach a 70 ms limit. "Low" priority I/Os would be forced into execution once they exceed 1000 ms. With the new stale I/O command limit, the controller 112 calculates a probabilistic "soft limit" for low priority I/Os to get executed in the event of a timeout or near timeout. The soft limit generally means that I/Os are not automatically activated even if the timeout period is breached. This cuts down on performance loss due to low priority timeouts. The controller 112, in setting the low priority soft limit, reduces the 99% command completion times for low priority I/Os, without impacting the overall I/O rate. The table below exemplarily illustrates how low priority limits change with queue depth and the selected allowable percentage of performance degradation.

| Queue depth    | IOPS | High Pri Read (99%) | Low Pri Read (99%) |
|----------------|------|---------------------|--------------------|
| 2 (degrade 2%) | 107  | 45                  | 56                 |
| 4 (degrade 2%) | 125  | 70                  | 110                |
| 8 (degrade 2%) | 141  | 78                  | 228                |
| 16 (degrade 2%)| 148  | 83                  | 485                |
| 32 (degrade 2%)| 149  | 100                 | 920                |
| 32 (degrade 0%)| 153  | 86                  | 986                |

Figure 3:
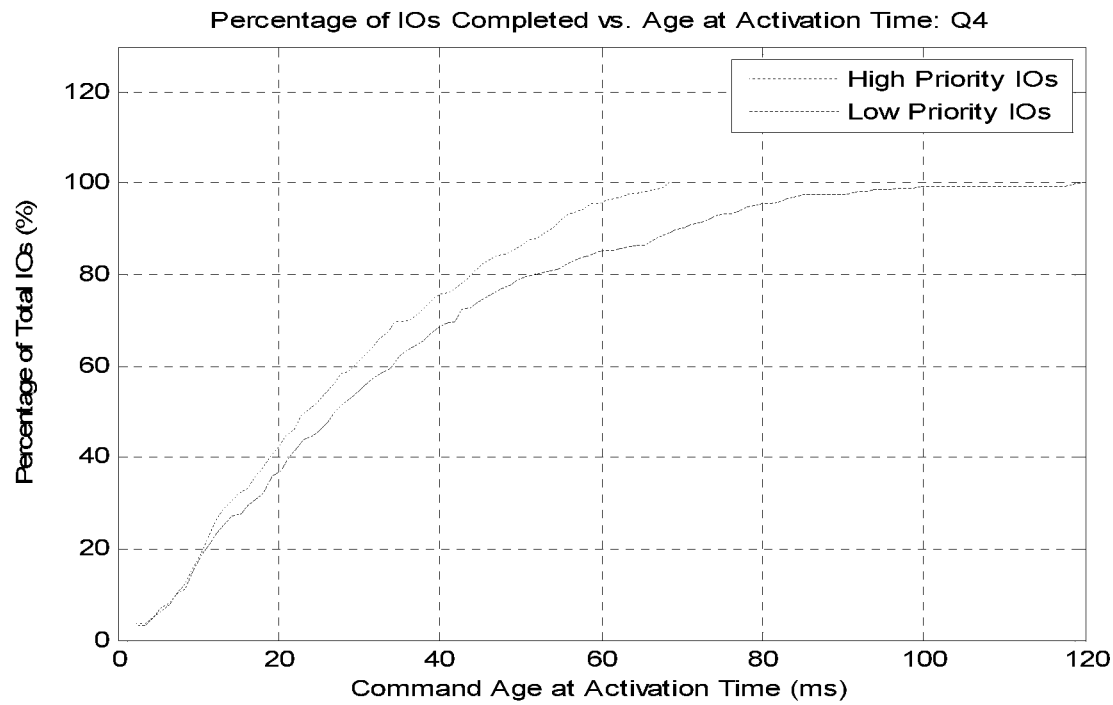
FIGS. 3-8 illustrate various graphs illustrating I/O completions and aging for various queue depths.
Figure 4:
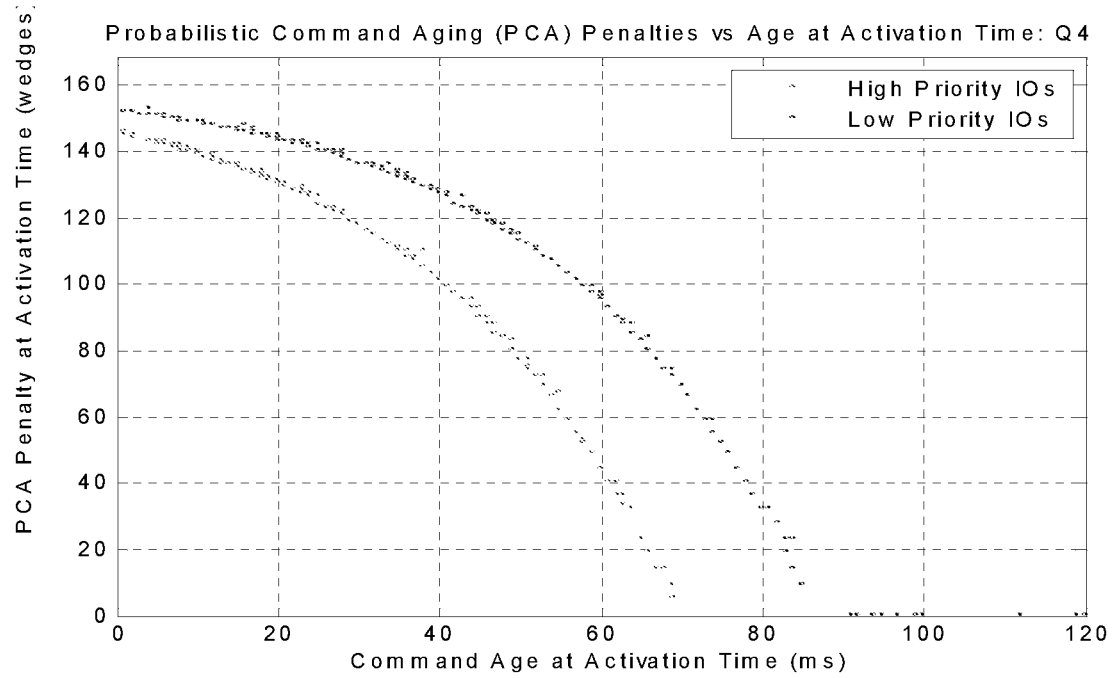
Figure 5:
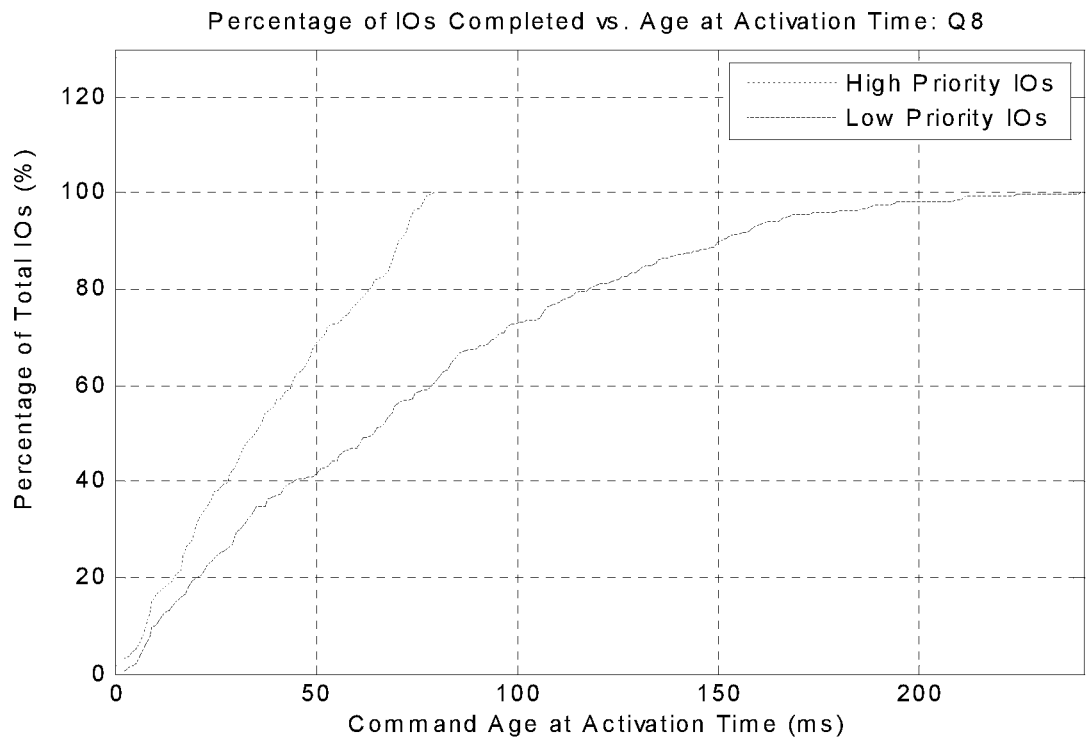
Figure 6:
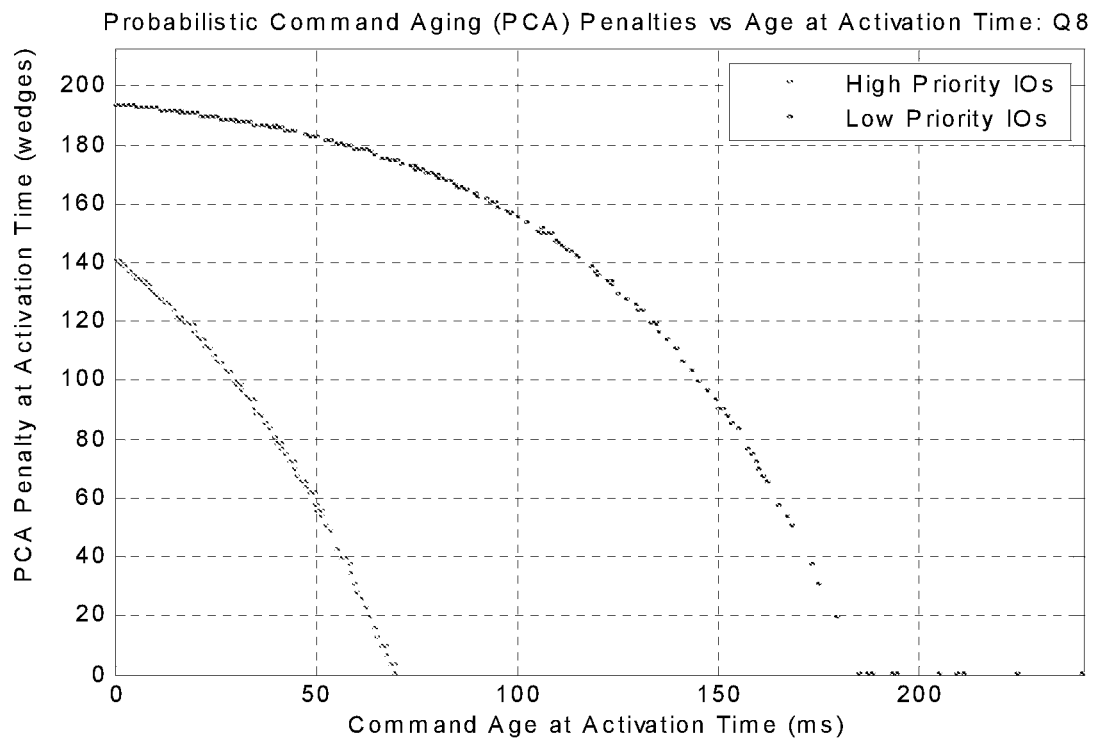
Figure 7:
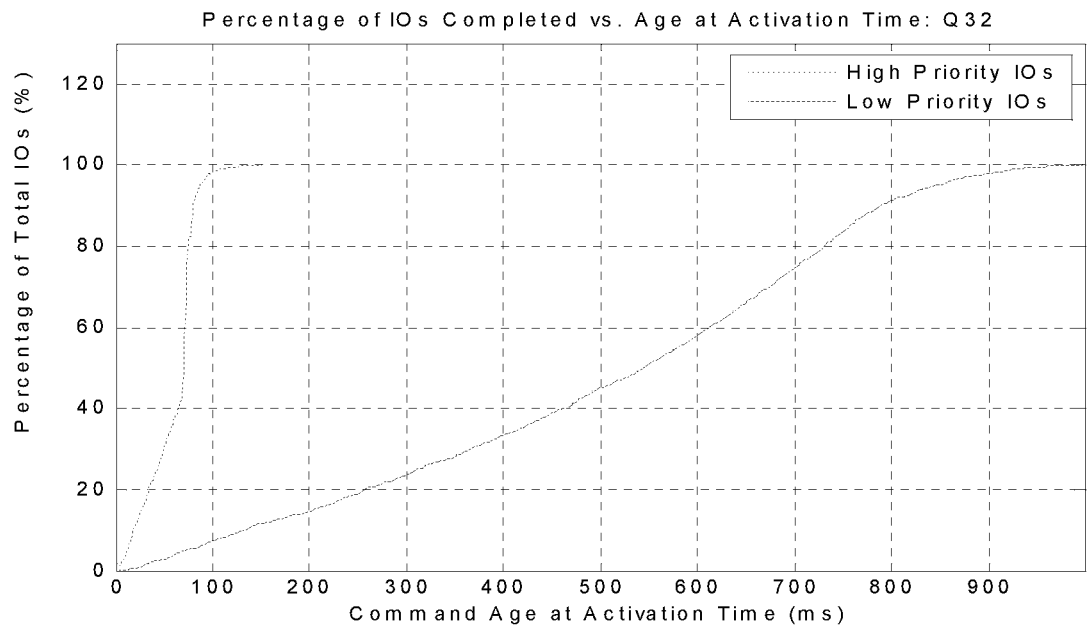
Figure 8:
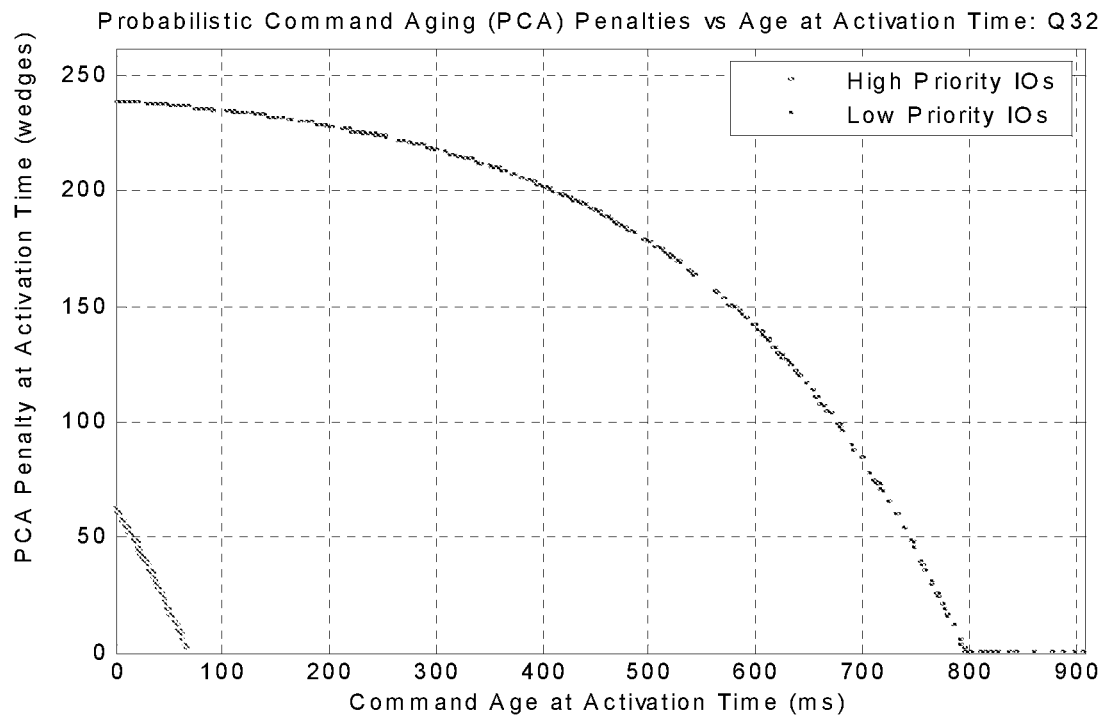

FIGS. 3-8 illustrate various graphs illustrating I/O completions and aging for various queue depths. For example, FIG. 3 illustrates a percentage of I/Os completed vs. the age of the I/Os at time of execution, or activation, for queue depth of 4. FIG. 4 illustrates probabilistic command aging penalties vs. the age of the I/Os at time of execution, or activation, for a queue depth of 4. FIGS. 5 and 6 illustrate these features for queue depths of 8 whereas FIGS. 7 and 8 illustrate these features for queue depths of 32.

Figure 9:
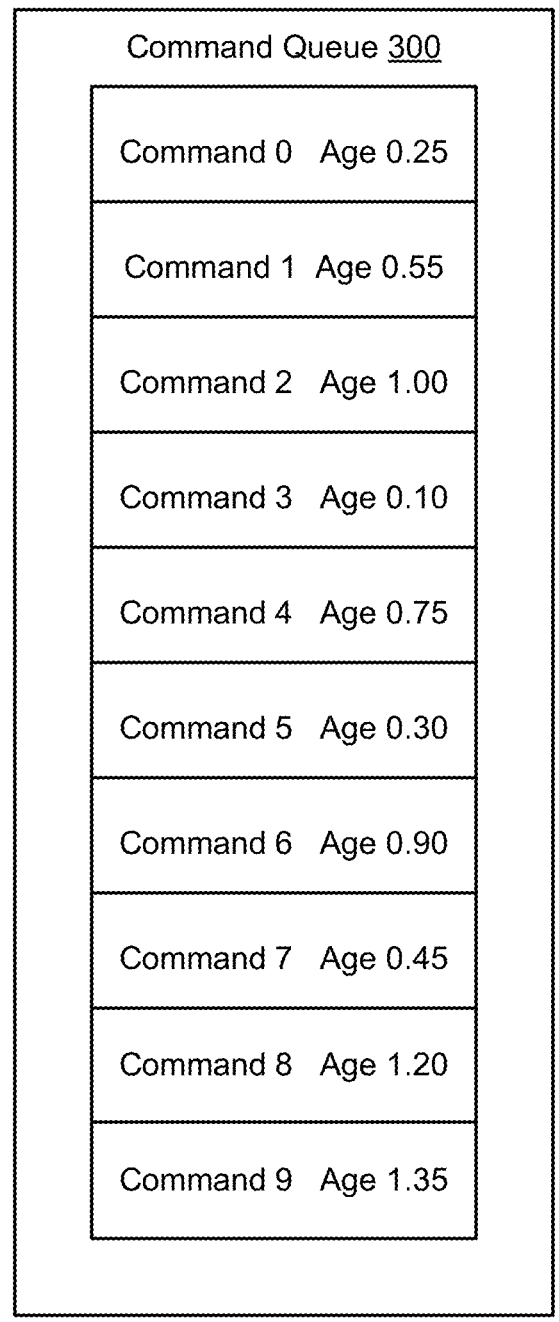
FIG. 9 is a block diagram of an exemplary queue of the computing system of FIG. 1.

FIG. 9 illustrates an exemplary queue 300 employing probabilistic aging command sorting operable with the computing system 10 of FIG. 1. The queue 300 may be implemented in the memory device 108 to store and organize pending commands, such as the I/Os discussed above. In this embodiment, queue 300 contains ten pending operations, ordered as command 0-command 9. The number of pending commands may be referred to as the queue depth of the queue 300 (e.g., 10 in this embodiment). The commands in the queue 300 may have one or more non-uniform attributes which can influence the selection of which command to execute next, or for a selected execution order of the commands. For example, each command may have one or more target sectors corresponding to transducer head and disk locations of the storage device 100-1, which may influence an access time for that command. Other attributes may include priority levels, transfer times, whether requested data exists in a cache, or other attributes.

A probabilistic command aging algorithm may track an age for each command in the queue 300. For example, the queue 300 may store the actual age value, a number of clock ticks since receipt, a timestamp of when the command was received from which the age can be calculated as needed, or the age may be monitored by other methods. In the queue 300, the age is shown for each command in terms of seconds since the command was received. Although the commands in the queue 300 are shown as tightly packed and ordered, they may be sparsely arranged or, more generally, may be organized in any logical fashion suitable for the circuitry of the storage device 100-1.

Commands may have a designated timeout period (e.g., 1.5 seconds, although longer or shorter timeout periods may be used). If a command reaches the timeout period without being executed, the command may expire, or it may be executed immediately regardless of its position in the queue 300. Assuming commands are queued such that commands with a lower command number are executed earliest, the queue 300 depicts an example in which the last command 9 in the queue 300 may be approaching the 1.5 second timeout period with an age of 1.35 seconds.

The controller 112 may calculate a probability of a command timing out, and factor that probability into an algorithm for organizing pending operations. For example, a probability of a command timing out may be weighed against a performance loss (e.g., based on an I/O rate of executing queued vs. unqueued commands) to determine when to execute the command.

The controller 112 may also calculate an effect on performance, using a number of calculations and approximations. In some embodiments, performance calculations or estimates may be performed externally to the computing system 10 by a manufacturer or other party. For example, some values and estimates may be pre-loaded on a device, or updated in device firmware with a software update. This may reduce processing of the controller 112 and improve performance.

An exemplary process of calculating a probability of timing out is now provided. With an example queue depth of 64 commands, the odds of a command not being picked for activation is approximately 63 out of 64, since one command may be activated at a time. The odds of this happening two times in a row is generally $(63/64)^2$. The odds of this happening "X" times in a row are generally $(63/64)^x$. The more general form of this equation may be represented as:

$$\text{Probability of not being picked for activation} = ((\text{queue depth}-1)/(\text{queue depth}))^x, \quad \text{Eq. 5.}$$

where "X" is the number of times the command is not picked for activation.

By knowing the I/O rate for a given workload and the amount of time remaining before a command will timeout, it is possible to calculate the probability that a command will timeout in the future. For example, with a queue depth of 64, suppose the storage device 100-1 can perform at an approximate I/O rate of 300 I/Os per second. An approximate I/O rate for a given queue depth for the storage device 100-1 can be determined during a manufacturing process, or may be determined based on performance measurements. For example, the approximate I/O rate for a selected number of queue depths may be stored (e.g., in the memory device 108) for the storage device 100-1, and the controller 112 may consult a table for a nearest I/O rate approximation based on the current queue depth. In some embodiments, an I/O rate approximation for a single selected queue depth may be used to simplify the probability calculation. In some embodiments, a larger queue depth means that more I/Os per second can be performed by a given drive, but higher average command completion times may occur and, thus the possibility of timeouts may increase, as command completion times are generally proportional to the queue depth.

If a command in the 64 depth queue has one second remaining before it times out, and the storage device 100-1 performs at approximately 300 I/O operations per second at 64 queue depth, this can leave approximately 300 opportunities for activation of the command: (I/Os per second*(time remaining until timeout)). The number of opportunities remaining can be inserted into Eq. 5 as the value of "X" to determine a probability of the command timing out. Then, using Eq. 5, the probability of this command timing out may be:

$$\text{POT}=(63/64)^{300}=0.0089. \quad \text{Eq. 6.}$$

The controller 112 may calculate an access time for a selected command to determine approximately how long it may take for the command to begin execution after the end of the current command being executed completes. This may be considered the "base" access time. For example, access time to the storage device 100-1 may be approximately calculated as a seek time (e.g., the time it takes to move a transducer head from a starting position to a target data track) plus additional rotational latency (e.g., the time it takes for the disk to rotate so that the head is positioned over the target data sectors on the track). The access time may be calculated from a given starting disk and head position, for example, based on a calculated head and disk location after executing a previous operation.

After the base access time has been calculated for a selected command, an adjustment to this value may be added based on the command's probability of timing out. Now, considering that I/O rates (or operation times) may also be expressed in terms of wedges, assume that the storage device 100-1 can perform at an average rate of 500 wedges per I/O when performing unqueued I/Os, and at an average rate of 300 wedges per I/O when operating at a queue depth of 128. Both I/O rates may have a distribution about a mean that is normal. Also assume that for a selected command, the probability of it timing out (i.e., the POT) is 50%, based on its age and the I/O rate of this workload. Then the future expected access time (FEAT) for the selected command may be calculated as follows:

$$\text{FEAT}=Q128\text{I/O rate(IOR)}+\text{POT}*(Q1\text{IOR}-Q128\text{IOR}). \quad \text{Eq. 7.}$$

Or, more specifically, FEAT=300+0.5*(500−300)=400 wedges to execute the selected command.

In some embodiments, the FEAT of Eq. 7 may be the weighted average of the queue 128 value (Q128) and the queue 1 value (Q1), and it may converge on the Q1 value when the probability of timeout reaches 100%. The FEAT value can be used to represent the average expected access time this command will have if left in the queue 300, instead of being activated as the next command, or being repositioned to a selected place in the queue 300.

Now, suppose an initial or "base" access time for a command in a queue of depth 128 is calculated to be 200 wedges. For example, this initial or base access time, as described above, may be calculated as seek time+rotational latency. The base access time may be calculated for a current head and disk position, or for an anticipated head and disk position after executing another given command. The base access time of 200 wedges may be a very fast access time relative to the Q128 distribution, and may be well above the FEAT calculated above. Relative benefit or detriment of activating the selected command may be calculated, for example, as:

$$\text{FEAT}-\text{base access time}. \quad \text{Eq. 8}$$

In this case, the relative benefit or detriment may be calculated as 400−200=200. So in general, activating a command "A" at the calculated position would represent a relative benefit of 200 wedges compared to leaving the command at its current queue position. For example, in systems that calculate which command to execute next from all commands in the queue 300, the controller 112 may choose to execute command "A" next rather than leaving it in the queue 300 for execution later, depending on calculated values of other queued commands. In some embodiments, a device may compare the FEAT to the base access time to determine whether to activate the command now or to place it in a corresponding command queue slot. If the comparison is positive, it may indicate that the command should be placed into the slot scheduled for activation. If the comparison is negative, it may indicate that the command should not be relocated to the slot scheduled for activation.

Once again, the FEAT, as calculated in the above example, is 400 wedges. An initial access time for a selected command "B", in a queue of 128, may be calculated to be 450 wedges. 450 wedges may be a relatively slow access time compared to the Q128 distribution, and is slower than the FEAT of 400 calculated above. In general, activating command "B" now would represent a relative negative over re-queuing of −50 wedges. For example, FEAT−base access time, in this case, is 400−450=−50 wedges. From this it can be seen that command timeouts may complicate the reordering process. So, the probability of a command timeout may be incorporated into access time calculations, as exemplarily described below.

$$\text{AverageAccessTimeForWorkload(ATWL)} = \text{Estimated};  \quad \text{Eq. 9.}$$

$$Q1\text{ Access Time}(Q1\text{AT}) = \text{Estimated; and}  \quad \text{Eq. 10.}$$

$$\text{IOR} = \text{Estimated}.  \quad \text{Eq. 11.}$$

ATWL generally refers to an average I/O rate at a given queue depth in terms of wedges per I/O operation. For example, this may be a representation of an average number of wedges per I/O operation when operating at a queue depth of 128. In some embodiments, the memory device 108 may store, for the storage device 100-1, a number of ATWL values for different workload sizes, it may store a single representative value (e.g., average workload), it may store a "worst case" value for a full queue workload, it may store other values, or any combination thereof. Q1AT generally refers to an average I/O rate in terms of wedges per operation for unqueued operations. And, IOR generally refers to an average number of operations per second at a given queue depth. Again, a number of I/O rates, one or more representative values, or any combination thereof may be stored in the memory device 108.

For example, ATWL, Q1AT, and IOR may be determined by a manufacturer of the storage device 100-1 based on the device's components and performance attributes, and stored to the device (or memory 108) for accessing. In some embodiments, these values may be determined or measured during operation of the storage device 100-1.

The following values may be calculated for each command:

$$\text{Access Time(AT)} = \text{Seek Time} + \text{Rotational Latency};  \quad \text{Eq. 12.}$$

$$\text{Time Remaining Before Timeout(TIME)} = \text{Timeout Limit} - \text{Age of Command};  \quad \text{Eq. 13.}$$

$$\text{Opportunities Remaining In Queue}(X) = \text{TIME} * \text{IOR};  \quad \text{Eq. 14.}$$

$$\text{POT} = (\text{Queue Depth} - 1)/(\text{Queue Depth})^x;  \quad \text{Eq. 15.}$$

$$\text{FEAT} = \text{ATWL} + \text{PROB} * (Q1\text{AT} - \text{ATWL}); \text{ and}  \quad \text{Eq. 16.}$$

$$\text{Timeout Adjusted AT(TAAT)} = \text{AT} - (\text{FEAT} - \text{AT}).  \quad \text{Eq. 17.}$$

The TAAT for a command, therefore, may be the command's AT (or "base" access time unmodified by a timeout probability), modified by the comparison of the probability of timeout—the modified FEAT and the AT. In some embodiments, the controller 112 may compare the TAAT of commands within the queue 300 to determine an order to execute the commands. For example, the TAAT for each command may be calculated, and the command with the lowest TAAT may be selected for execution next. TAAT may be simplified, as follows:

$$\text{TAAT} = 2\text{AT} - \text{ATWL} - \text{PROB} * (Q1\text{AT} - \text{ATWL}).  \quad \text{Eq. 18.}$$

In some embodiments, ATWL may be a predetermined value (e.g., calculated by a manufacturer), and therefore may be considered a constant for any given workload. Adding a constant to all commands in the queue 300 may not change their order, so it may be removed from the TAAT calculation. Also, since dividing all access times by two may not change a command order, TAAT may be further simplified as:

$$\text{TAAT} = \text{AT} - \text{PROB} * (Q1\text{AT} - \text{ATWL})/2.  \quad \text{Eq. 19.}$$

In some embodiments, a lookup table may be used in place of performing some calculations. For example, using a lookup table may avoid the need to perform exponent calculations when computing the PROB value. In some embodiments, rather than having a lookup table for all possible queue depths, a number of lookup tables for selected queue depths could be used (e.g., 16, 32, 64, etc.), and a closest approximate queue-depth table could be used for calculations. In some embodiments, lookup tables for one or more queue depths could be stored, and index scaling could be employed to account for variations in the actual queue depth.

An example of employing index scaling on a lookup table may include:
1. Create lookup table for some base queue depth value ($Q_{base}$). For example, the $Q_{base}$ value may be an average queue depth (QD) for the device, a worst-case queue depth, or other queue depths.
2. Scale the index into the table (X) by the scalar $Q_{base}/\text{QD}$. QD can refer to an actual or current queue depth when performing the calculations.

For example, a lookup table for a selected $Q_{base}$ may be populated with values based on the equation:

$$\text{Probability}(Q\text{base}) = ((Q\text{base} - 1)/Q\text{base})^x,  \quad \text{Eq. 20.}$$

for some input value 'X,' with X indicating a number of I/O opportunities left before a command times out.

Similarly, a lookup table for an actual queue depth 'Q' may be populated with values based on the equation:

$$\text{Probability}(Q) = ((Q - 1)/Q)^x.  \quad \text{Eq. 21.}$$

It can be assumed that the Probability (Q) differs from the Probability (Qbase) by a scaling constant 'C' on the exponent 'X', as follows:

$$\text{Probability}(Q) = ((Q - 1)/Q)^x = ((Q_{base} - 1)/Q_{base})^{cx}.  \quad \text{Eq. 22.}$$

By taking the logarithm of both sides, and solving for 'C,' it can be seen that:

$$C = \log((Q - 1)/Q)/\log((Q_{base} - 1)/Q_{base})).  \quad \text{Eq. 23.}$$

The equation may be further simplified by using the linear approximation of: "Log(R)~R−1" for values of R close to 1.

This can be a fairly good assumption given that ratio of $(Q-1)/Q$ may be very close to 1 for the probability calculations. This approximation can lead to a simplified equation for 'C', as follows:

$$C=Q_{base}/Q. \quad \text{Eq. 24.}$$

In some examples, using the probability table architecture derived above, the new process steps may include calculating, for each command:

$$AT=\text{Seek Time+Rotational Latency;} \quad \text{Eq. 25.}$$

$$TIME=\text{Timeout Limit-Age of Command;} \quad \text{Eq. 26.}$$

$$\text{Opportunities Remaining In Queue}(X)=TIME*IOR; \quad \text{Eq. 27.}$$

$$C*X=X*Q_{base}/Q; \quad \text{Eq. 28.}$$

$$PROB=\text{Probability term of Table}[C*X]; \text{ and} \quad \text{Eq. 29.}$$

$$TAAT=AT-PROB*(Q1AT-ATWL)/2, \quad \text{Eq. 30.}$$

assuming the same estimated or calculated values for ATWL, Q1AT, and IOR as described above.

The algorithms and computations provided above are just examples. Different equations, estimates, variables, and values can be used to calculate a probability of a command timing out and adjust command executions based on the probability. For example, the TAAT equation provided above may be simplified further by approximating variables. For example, rather than employing multiple probability tables, or using a scaling constant 'C,' a single probability lookup table could be implemented using a "worst-case" full queue depth and disregarding the actual current queue depth. In some embodiments, ATWL, Q1AT, or both could be constants stored for the storage device 101-1 in the memory device 108.

Using Eq. 30 above as an example, if the values for Q1AT and ATWL were constants, and a single probability lookup table was employed, the probability lookup table could be populated with values taking into account the Q1AT and ATWL values. The calculations for "PROB*(Q1AT−ATWL)/2" could then be performed prior to command execution and stored in the lookup table by a manufacturer of the storage device 101-1. For example, the lookup table could store values representing an access time adjustment as a factor of a number of execution opportunities remaining. When simplified as described, the calculations performed for a command to derive an access time modified based on a probability of timeout may then be reduced to:

$$AT=\text{SeekTime+Rotational Latency;} \quad \text{Eq. 31.}$$

$$TIME=\text{Timeout Limit-Age of Command;} \quad \text{Eq. 32.}$$

$$\text{Opportunities Remaining In Queue}(X)=TIME*IOR; \quad \text{Eq. 33.}$$

$$PROB=\text{Probability term of Table}[X]; \text{ and} \quad \text{Eq. 34.}$$

$$TAAT=AT-\text{Probability term of Table}[X]. \quad \text{Eq. 35.}$$

Using estimated constants and simplified probabilistic aging algorithms may provide much of the performance benefit while reducing a run-time computational overhead.

Calculating TAAT is based on a statistical algorithm, so scenarios may arise where an I/O operation is selected for a queue position even with a poorly calculated AT. The storage device 100-1 may be configured to perform additional calculations or logic checks to limit such instances. For example, the storage device 100-1 may be configured to exclude reordering of an operation if the calculated AT is greater than the Q1AT, meaning that the command will take longer to execute than an average command executed at a queue depth of 1. In some embodiments, a command may require an AT that is better than the Q1AT by some selected threshold. Other embodiments are also possible.

Figure 10:
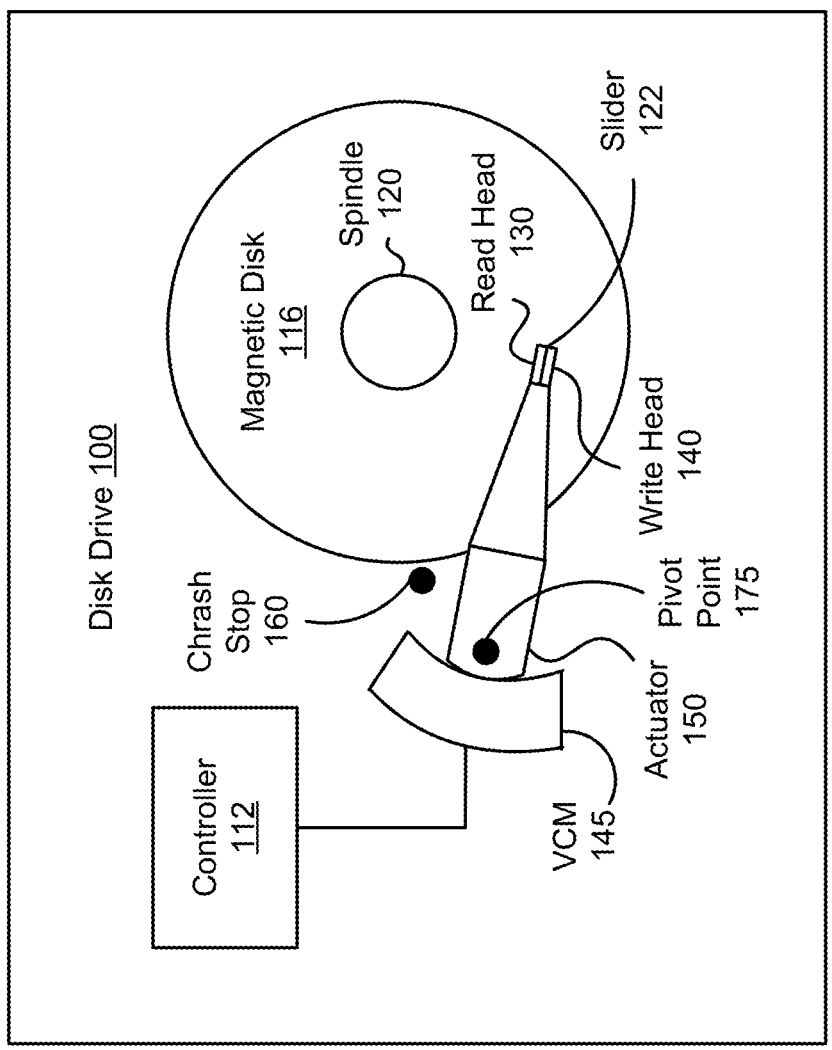
FIG. 10 illustrates an exemplary disk drive system.

FIG. 10 illustrates an overhead view of an exemplary HDD 100 (e.g., the storage device 100-1) that may be used to implement the embodiments described hereinabove. The HDD 100 includes a magnetic disk 116 which is rotatably mounted upon a motorized spindle 120. A slider 122, having a read head 130 and a write head 140 fabricated thereon, is mounted on an actuator 150 to "fly" above the surface of the rotating magnetic disk 116. The HDD 100 also includes a controller 112 that is operable to apply a positional voltage to a VCM 145 to control the position of the actuator 150. The HDD 100 may also include an inner diameter crash stop 160 to hold the read head 130 and the write head 140 still at a fixed radius relative to the center of the magnetic disk 116. For example, the actuator 150 pivots about the pivot point 175 against the crash stop 160 to prevent the read head 130 and the write head 140 from traveling past a certain point at the inner diameter of the magnetic disk 116. The HDD 100 may include other components (e.g., a spindle motor used to rotate the magnetic disk 116) that are not shown for the sake of brevity.

The HDD 100 can be implemented with a desktop computer, a laptop computer, a server, a personal digital assistant (PDA), a telephone, a music player, or any other device requiring the storage and retrieval of digital data. Additionally, certain components within the HDD 100 may be implemented as hardware, software, firmware, or various combinations thereof.

Figure 11:
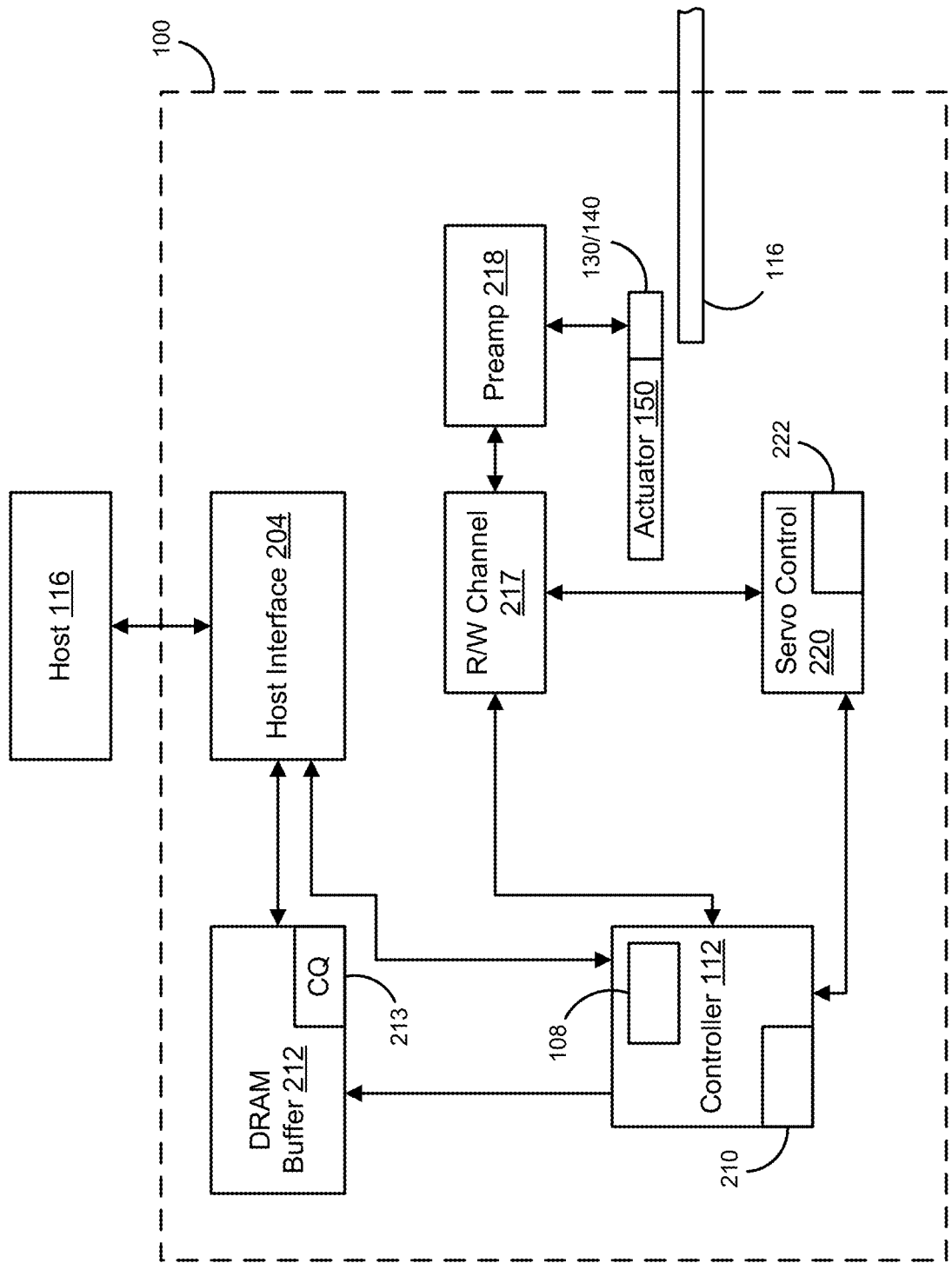
FIG. 11 illustrates an exemplary functional block diagram of the disk drive system of FIG. 1.

FIG. 11 is a functional block diagram of the HDD 100. The HDD 100 can communicate with the host system 115 via a hardware/firmware based host interface 204. The controller 112 may be configured with memory 208 and a processor 210. A Dynamic Random Access Memory (DRAM) buffer 212 can temporarily store user data during read and write operations and can include a command queue (CQ) 213 where multiple pending access operations can be temporarily stored pending execution. The HDD 100 may also include a read/write (R/W) channel 217, which may encode data during write operations and reconstruct user data retrieved from the magnetic disk(s) 116 during read operations. A preamplifier/driver circuit (preamp) 218 can apply write currents to the head(s) 130/140 and provide pre-amplification of readback signals. A servo control circuit 220 may use servo data to provide the appropriate signaling to the VCM 145 to position the head(s) 130/140 over the magnetic disk(s) 116 via the actuator 150. The controller 112 can communicate with a processor 222 of the servo control circuit 220 to move the head(s) 130/140 to the desired locations on the magnetic disk(s) 116 during execution of various pending commands in the CQ 213.

We claim:

1. A storage system, comprising:
a persistent storage medium;
a memory device operable to queue input/output (I/O) commands having at least first and second priorities with the first priority being higher than the second priority; and
a controller operable to establish an execution time limit that defines a period of time in which a queued second priority I/O command to the persistent storage medium is to execute,
wherein the controller is further operable to establish a performance degradation value that decreases I/O processing performance of the storage system, overrides the execution time limit of the queued second priority I/O command, and increases a probability of executing the queued second priority I/O command, the controller being further operable to calculate an actual performance loss based on the established performance degradation value to extend the execution time limit for the queued second priority I/O command, to calculate a probability of timeout for the queued second priority I/O command based on the actual performance loss, and to use the probability of timeout as an index to a table of probabilities to identify the extended execution time limit for the queued second priority I/O command, the timeout leading to a first-in-first-out servicing of the I/O commands.

2. The storage system of claim 1, wherein:
the storage system is a disk drive, a solid state drive (SSD), an enterprise storage system, a Redundant Array of Independent Disks storage system, a cloud computing storage system, or a combination thereof.

3. The storage system of claim 1, wherein:
the persistent storage medium is a magnetic disk; and
the controller is further operable to calculate the actual performance loss based on a portion of a revolution of the magnetic disk.

4. The storage system of claim 1, wherein:
the controller is further operable to determine an access time to execute the queued I/O command based on a placement in a queue of the memory device.

5. The storage system of claim 4, wherein:
the controller is further operable to determine the access time based on an I/O rate of the storage system.

6. A method operable in a storage system, the method comprising:
establishing at least two priorities for input/output (I/O) commands to the storage system;
establishing a first execution time limit for a first of the at least two priorities, wherein an expiration of the first execution time limit causes an execution of a queued I/O command with the first priority;
establishing a second execution time limit for a second of the at least two priorities, wherein an expiration of the second execution time limit is operable to trigger a timeout if a queued I/O command with the second priority is not executed by the second execution time limit, the timeout leading to a first-in-first-out servicing of the I/O commands;
establishing a performance degradation value that decreases I/O processing performance of the storage system;
calculating an actual performance loss based on the established performance degradation value;
calculating a probability of timeout for the queued I/O command with the second priority based on the actual performance loss;

accessing an index to a table of probabilities using the probability of timeout to identify an extended execution time limit for the queued I/O command with the second priority; and
overriding the second execution time limit to increase a probability of executing the queued I/O command with the second priority.

7. The method of claim 6, wherein:
the storage system is a disk drive, a solid state drive (SSD), an enterprise storage system, a Redundant Array of Independent Disks storage system, a cloud computing storage system, or a combination thereof.

8. The method of claim 6, wherein:
calculating the actual performance loss is based on a portion of a revolution of a magnetic disk.

9. The method of claim 6, further comprising:
determining an access time to execute the queued I/O command with the second priority based on a placement in a queue.

10. The method of claim 9, further comprising:
determining the access time based on an I/O rate of the storage system.

11. A method operable in a storage system, the method comprising:
establishing a performance degradation value that decreases input/output (I/O) processing performance of the storage system;
calculating an actual performance loss based on the established performance degradation value;
receiving first and second I/O commands to the storage system;
determining that the first I/O command has a higher priority than the second I/O command;
queueing the second I/O command for servicing before a timeout period, the timeout period leading to a first-in-first-out servicing of the I/O commands;
servicing the first I/O command;
calculating a probability of timeout for the queued second I/O command based on the actual performance loss; and
accessing an index to a table of probabilities using the probability of timeout to identify an extended execution time limit for the queued second I/O command;
overriding the timeout period to increase a probability of executing the queued second I/O command; and
servicing the queued second I/O command after the timeout period based on the extended execution time limit.

12. The method of claim 11, wherein:
the storage system is a disk drive, a solid state drive (SSD), an enterprise storage system, a Redundant Array of Independent Disks storage system, a cloud computing storage system, or a combination thereof.

13. The method of claim 11, wherein:
calculating the actual performance loss is based on a portion of a revolution of a magnetic disk.

* * * * *